United States Patent [19]

Curvin

[11] Patent Number: 5,587,007
[45] Date of Patent: Dec. 24, 1996

[54] MODIFIED DICYCLOPENTADIENE RESINS

[75] Inventor: Daniel R. Curvin, Franklin, Va.

[73] Assignee: Arizona Chemical Company, Panama City, Fla.

[21] Appl. No.: 514,764

[22] Filed: Aug. 14, 1995

[51] Int. Cl.$^6$ .................. C09D 11/00; C08G 63/00
[52] U.S. Cl. .................. 106/23; 528/176; 528/192; 528/193; 528/194; 528/212; 528/219; 528/272; 528/295.3; 528/295.5; 528/302; 528/303; 528/306; 528/307; 106/20 R; 106/27 R
[58] Field of Search .................. 528/176, 192, 528/193, 194, 212, 219, 272, 295.3, 295.5, 302, 303, 306, 307; 126/20 R, 23 E, 27 R

[56] References Cited

U.S. PATENT DOCUMENTS

| | | | |
|---|---|---|---|
| 3,880,788 | 4/1975 | Rudolphy | 525/54.42 |
| 4,087,483 | 5/1978 | Geerdes | 525/285 |
| 4,139,500 | 2/1979 | Rudolphy | 525/54.44 |
| 4,506,059 | 3/1985 | Hultzsch et al. | 525/134 |
| 4,552,923 | 11/1985 | Tsuchiya et al. | 525/68 |
| 4,574,057 | 3/1986 | Kaza et al. | 526/238.3 |
| 5,405,932 | 4/1995 | Bender et al. | 528/104 |

*Primary Examiner*—Samuel A. Acquah
*Attorney, Agent, or Firm*—Luedeka, Neely & Graham, P.C.

[57] ABSTRACT

The specification describes a method for preparing a phenol-modified dicyclopentadiene resin. The method comprises reacting (a) dicyclopentadiene, (b) a phenol selected from the group consisting of an alkyl phenol having the formula $CH_3C_nH_{2n}C_6H_4OH$, where n is from 1 to 9, and a bisphenol having the formula $HOC_6H_4(CR_2)_xC_6H_4OH$, where R is independently hydrogen or a $C_1$–$C_6$ alkyl group and x is from 1 to 4, or mixtures thereof; (c) a fatty acid or a derivative thereof selected from the group consisting of tall oil, a tall oil derivative, dimer fatty acid, linseed oil and mixtures thereof; and (d) an unsaturated organic diacid or an anhydride thereof, at a temperature and autogenous pressure sufficient to produce a phenol-modified dicyclopentadiene resin. The resin product exhibits improved compatibility with ink vehicles and formulations, particularly ARLO or alkyd modified inks.

25 Claims, No Drawings

MODIFIED DICYCLOPENTADIENE RESINS

FIELD OF THE INVENTION

The present invention relates to methods for preparing dicyclopentadiene resins and to resins produced by such methods. These resins are particularly well-suited for use in ink vehicles and formulations.

BACKGROUND OF THE INVENTION

Adhesives, inks and coatings are typically blended formulations consisting of high molecular weight polymers, resins, oils, waxes, pigments, solvents and other additives. In these formulations, it is well known that the resins are major and crucial components needed to impart the formulation rheology and end-use performance characteristics.

Hydrocarbon resins are commonly used in ink formulations containing alkali-refined linseed oil (ARLO). Such resins include, for example, vinyl aromatic-modified dicyclopentadiene (DCPD) resins. These modified DCPD resins are prepared in a two-stage process: polymerization followed by esterification. The two-stage process adds ester functionality to the final resin through a thermal post-esterification.

The vinyl aromatics in modified DCPD resins improve their ARLO compatibility, but typically detract from their end-use performance with other ink vehicle components such as pigments. Additionally, using vinyl aromatics to modify DCPD resins results in darker resins than desired. Thus, there is a need to produce DCPD resins which are compatible with ARLO as well as with the other components of ink and ink vehicle formulations and which have a lighter color.

It is therefore an object of the present invention to provide an improved DCPD resin for ink vehicle formulations and a method of making the resin.

Another object of the present invention is to provide a DCPD resin and method of its production with ARLO compatibility equal or superior to current ink formulation resins without the addition of vinyl aromatics or a time consuming two-stage reaction process.

A further object of the present invention is to provide a DCPD resin with superior compatibility, as compared to current resins, with the various components of ink formulations for a wide range of uses.

SUMMARY OF THE INVENTION

With regard to the above and other objects, the present invention is directed to a method for making a modified dicyclopentadiene resin. The method comprises reacting dicyclopentadiene with a phenol selected from the group consisting of an alkyl phenol having the formula $CH_3C_nH_{2n}C_6H_4OH$, where n is from 1 to 9 and a bisphenol having the formula $HOC_6H_4(CR_2)_xC_6H_4OH$ where R is hydrogen or a $C_1$–$C_6$ alkyl group and x is from 1 to 4 and mixtures thereof, a fatty acid or a derivative thereof selected from the group consisting of tall oil, a tall oil derivative, dimer fatty acid, linseed oil and mixtures thereof, and an unsaturated organic diacid or anhydride thereof, at a temperature and pressure sufficient to produce a phenol-modified dicyclopentadiene resin.

According to a preferred embodiment of the invention, a modified DCPD resin may be prepared by charging a pressurizable reaction vessel with a reaction mixture comprising dicyclopentadiene, a phenol selected from the group consisting of an alkyl phenol having the formula $CH_3C_nH_{2n}C_6H_4OH$, where n is from 1 to 9, and a bisphenol having the formula $HOC_6H_4(CR_2)_xC_6H4OH$, where R is independently hydrogen or a $C_1$–$C_6$ alkyl group and x is from 1 to 4 and mixtures thereof, a fatty acid or a derivative thereof selected from the group consisting of tall oil, a tall oil derivative, dimer fatty acid, linseed oil and mixtures thereof, and an unsaturated organic diacid or anhydride thereof. The reaction vessel is then sealed and the reaction mixture heated to a reaction temperature selected to promote formation of a phenol-modified DCPD resin. The reaction mixture is maintained at the reaction temperature under autogenous pressure for a period of time sufficient to yield the phenol-modified DCPD resin.

The present invention also provides a phenol-modified DCPD resin prepared according to the method of the invention above. The resin exhibits improved compatibility with most ink formulations, particularly those containing alkyds or ARLO.

DETAILED DESCRIPTION OF THE INVENTION

The present invention is directed to a method for preparing a modified dicyclopentadiene resin useful in ink formulations and exhibiting compatibility with a range of formulation ingredients including alkyds and drying oils such as ARLO. The method comprises reacting dicyclopentadiene (DCPD) with a phenol selected from the group consisting of an alkyl phenol having the formula $CH_3C_nH_{2n}C_6H_4OH$, where n is from 1 to 9, and a bisphenol having the formula $HOC_6H_4(CR_2)_xC_6H_4OH$, where R is independently hydrogen or a $C_1$–$C_6$ alkyl group and x is from 1 to 4 and mixtures thereof, a fatty acid or a derivative thereof selected from the group consisting of tall oil, a tall oil derivative, dimer fatty acid, linseed oil and mixtures thereof, and an unsaturated organic diacid or an anhydride thereof under conditions sufficient to produce a phenol-modified cyclopentadiene resin.

The dicyclopentadiene used in the method of the invention may be DCPD itself or a resin-grade DCPD concentrate as used in the art. The DCPD concentrate may contain from about 35% to about 99% by weight DCPD with the balance being a variety of saturated and unsaturated hydrocarbons. Preferably, the DCPD concentrate contains from about 70% to 99% by weight DCPD. Concentrates with lower levels of dicyclopentadiene may produce darker resins which may be undesirable for use in ink vehicles. However, the overall ink vehicle compatibility of the resulting phenol-modified DCPD resins remains high even with those concentrates having less than below about 70% by weight DCPD.

Phenols useful in this invention include an alkyl phenol having the formula $CH_3C_nH_{2n}C_6H_4OH$, where n is from 1 to 9, a bisphenol having the formula $HOC_6H_4(CR_2)_xC_6H_4OH$, where R is independently hydrogen or a $C_1$–$C_6$ alkyl group and x is from 1 to 4 and mixtures of these phenols. The phenols may be ortho-, meta-, or para-phenols or mixtures of such phenols. The alkyl chains of the phenols may be branched or unbranched. For an alkyl phenol, the integer "n" preferably varies from 4 to 8 and, most preferably, n is 7. For a bisphenol, R is preferably hydrogen, methyl, ethyl, or propyl, and most preferably methyl. The integer "x" is preferably 1 or 2, and most preferably 1. Preferred phenols include tert-butyl phenol, octylphenol, nonylphenol, bisphenol A and mixtures thereof. Nonylphenol is particularly preferred.

The fatty acid or derivative thereof may be selected from tall oil, a tall oil derivative, dimer fatty acid, and linseed oil, and mixtures thereof. Tall oil or a tall oil derivative is preferred. When linseed oil is employed, ARLO is preferred.

Any tall oil or tall oil derivative may be used in the method of the invention. The tall oil may be a crude tall oil, distilled tall oil, tall oil fatty acid, tall oil rosin, etc. or mixtures of these tall oils. Preferably, the tall oil derivative used is distilled tall oil and more preferably, the middle cut from such a distillation. The presence of the tall oil in the reaction mixture provides fatty acid and rosin acid moieties to modify the polymeric DCPD backbone. Also, the tall oil provides active carboxyls to react with any gellants which may be used in the formulation of the ink vehicle.

Any unsaturated organic diacid or an anhydride of that diacid or anhydride may be used in the present invention. The unsaturated organic diacid or anhydride is preferably selected from the group consisting of fumaric acid, maleic acid and maleic anhydride and, most preferably, is fumaric acid. As with the fatty acid or fatty acid derivative, the organic diacid or its anhydride is believed to promote desired interactions between the final resin and gellants to form ink vehicles. The organic diacid or its anhydride also modify the compatibility of the resin.

In the method of the invention, the DCPD or a DCPD concentrate is present generally in the range of from about 45 wt. % to about 80 wt. %, preferably from about 55 wt. % to about 75 wt. % by weight, and most preferably about 70 wt. %. The phenol and the fatty acid or derivative thereof are generally present in the range of from about 10 wt. % to about 20 wt. %, and preferably about 15 wt. %, each. The unsaturated organic diacid or its anhydride is generally present at concentrations in the range of from about 0.5 wt. % to about 1.5 wt. % and preferably about 1 wt. %.

The reaction to produce the phenol-modified DCPD resin takes place at a temperature and a pressure sufficient to produce the desired resin. Preferably, the reaction temperature ranges from about 250° C. to about 300° C., more preferably from about 270° C. to about 280° C., and most preferably is 275° C. The reaction preferably takes place in a sealed reaction vessel and reaches its own autogenous pressure. This pressure generally ranges from 50 to 150 psi.

It will be appreciated that the method of the invention considerably simplifies preparation of DCPD resins, requiring only a single reaction step to yield the desired resin. The method of the invention also employs relatively inexpensive, readily available starting materials. The temperature and conditions are relatively mild, so the method may be practiced using conventional pressure reactors and equipment already available in most plants.

In the practice of the present invention a single step reaction is used to prepare a phenol-modified DCPD resin which exhibits a high compatibility with linseed oil and other components of ink and ink vehicle formulations.

A preferred method for preparing a phenol-modified DCPD resin may be accomplished by charging a pressurizable reaction vessel with a reaction mixture comprising (a) dicyclopentadiene, (b) a phenol or a mixture of phenols as described above, (c) a fatty acid or a derivative thereof, and (d) an unsaturated organic diacid or its anhydride. The order of addition of the reactants is not believed to be critical.

The reaction vessel may be equipped with heating and stirring apparatus as is well-known to those of ordinary skill. The reaction is preferably conducted under an inert gas atmosphere, such as nitrogen.

The reaction vessel is preferably sealed after addition of the reactants and the reaction mixture heated to a reaction temperature sufficient to promote a reaction to produce a phenol-modified DCPD resin. The reaction mixture is maintained at the reaction temperature for a period of time sufficient to advance the reaction to produce the phenol-modified DCPD resin.

The reaction mixture is preferably heated to the reaction temperature by gradually increasing the temperature. Heating the mixture too rapidly may lead to the formation of undesirable polymeric materials which may darken the final product. Too slow a warm-up, however, may extend the reaction time unnecessarily. The rate of heating therefore should preferably be in the range of from about 45 minutes to about 4 hours, with the most preferable heat-up period being in the range of about 1 hour. Typically, the starting temperature will be about 25° C., approximately room temperature. Of course, if the reactants are at a higher initial temperature, the heat-up period may be shortened.

Preferably, the temperature of reaction mixture is increased to a temperature in the range of from about 260° C. to about 290° C. over a heat-up period of from about 45 minutes to about 75 minutes. The temperature of the reaction mixture is then maintained in the range of from about 260° C. to about 290° C. for from about 6 hours to about 24 hours. Preferably the reaction time is about 20 hours.

After the reaction is complete, the resulting reaction product mass may be removed or discharged from the reaction vessel to recover the phenol-modified DCPD resin. Preferably, the reaction product mass is discharged into a sparging vessel, where it may be reheated (or the heating continued) and sparged with an inert vapor to remove non-reacted components and unwanted by-products such as low molecular weight oligomers. The inert vapor may be, for example, steam, carbon dioxide or nitrogen. The sparged resin may be cooled and used directly or stored for later use.

The phenol-modified DCPD resins produced according to the invention generally have softening points in the range of from about 135° C. to about 175° C. and colors in the range of from about Gardner 11 to about Gardner 18. Further, the resins produced according to the method of the present invention have acid numbers in the range of from about 5.5 to about 18.0. These properties make the phenol-modified DCPD resin particularly suitable for use in inks and ink vehicles.

Printing inks, in a very general sense, are combinations of pigment, binder, and solvent. The binder serves to provide toughness and adhere the pigment to the substrate surface. The phenol-modified DCPD resin produced according to the present invention may act as a binder in the ink formulation. The solvent serves as a means of applying the pigment, and the ink dries when the solvent either evaporates, oxidizes, and/or penetrates into a substrate. Typical solvents include ARLO and MAGIESOL 47 product (aliphatic ink oil solvent available from Magie Brothers Oil Company, a division of Pennzoil) although any one of a number of conventional solvents may be used with the phenol-modified DCPD resin of this invention.

Lithographic printing is one of the most commonly used printing processes. For lithographic printing, a high boiling aliphatic and/or a fatty acid-derived ester solvent, such as ARLO, is used. Compatibility of the binder resin system, such as that prepared in the present invention, with the solvent is an important performance parameter.

As known in the art, a pigment may be introduced into a lithographic ink either by dispersing dry pigment into the binder/solvent mixture using a high shear mixer or by the preferred means of pigment "flushing". Ink pigments are synthesized by techniques that ultimately result in a hydrated pigment mass termed a "press-cake". Flushing involves displacing the water by intensive mixing in the presence of a varnish typically consisting of a high solubility resin in an ink oil solvent. This in effect "flushes" the water from the pigment resulting in a pigment dispersion in the varnish.

Commercial lithographic printing inks are typically constructed from a gelled vehicle and the flushed pigment dispersion. In order to achieve acceptable performance on the printing press, the ink system must have certain rheological characteristics. The desired rheological characteristics are imparted principally by the gelled vehicle. The rheological characteristics of the gelled vehicle are often achieved by the addition of aluminum-based gelling agents that react with the resins of the vehicle system.

The gellable lithographic vehicles are typically composed of several resins, often a gel reactive resin, called a high molecular weight resin, and a cosolubilizing resin, called a low molecular weight resin. Although these resins are called high and low molecular weight resins, the names are more historic than descriptive. The gel reactive resin is the species desired to react with the gelling agent to achieve the proper rheology. The cosolublizing resin is used to "solubilize" the system so that a homogeneous mixture results. Typically the cosolubilizing resin interferes with the formation of the proper rheology by dilution and therefore has a dilatory effect.

The phenol-modified DCPD resin of the present invention gives good rheology and may be employed as a gel reactive resin in an ink vehicle. Advantageously, the phenol-modified DCPD resin may even obviate the need for the cosolubilizing resin due to its improved ink oil solubility and compatibility with the ink vehicle and other components. Thus, the phenol-modified DCPD resin of the present invention avoids having to compromise the rheology of the vehicle in order to maintain compatibility and solubility.

In order to provide a better understanding of the present invention, the following examples further illustrate, but do not limit, the invention.

EXAMPLE I

A pressure reactor equipped with external heating, cooling and agitation was charged with 1260 parts DCPD concentrate (about 80% by weight DCPD), 270 parts nonylphenol, 252 parts distilled tall oil, and 18 parts fumaric acid. The pressure reactor was sealed under a nitrogen blanket and the temperature of the reactant mixture was steadily increased from about 25° C. to 275° C. over a one hour period. The reaction mixture was held at 275° C. for approximately 20 hours. Periodically, the reaction mixture was sampled to ensure that the reaction was advancing as desired. After the 20 hours, the reactor was cooled to 200° C. and the reaction mass was discharged from the reactor into a sparging vessel for further processing. The reaction mass in the vessel was reheated and held at 250° C. for steam sparging to remove approximately 10% of unreacted components and unwanted by-products such as low molecular weight oligomers. The resin was then discharged from the glass reaction flask and allowed to cool to room temperature. The final product was analyzed and had a softening point (ring and ball) of 161° C. The resin also had a 50% NV MAGIESOL 47 viscosity of Z3.2, a 33.3% linseed oil (AR grade) viscosity of Y.5, a MAGIESOL 47 tolerance of 22 cc and a linseed oil tolerance of 200+cc. In addition, the resin had a MAGIESOL 47 color of 17, an acid number of 16.2 and a resin yield of 93.6%.

EXAMPLE II

In accordance with the method of Example I, a series of DCPD resins was prepared with varying amounts of substituted phenols. Table I gives the components of the reaction mixture, Table II gives the reaction conditions and resin yield, and Table III gives the physical properties of the resulting resins.

TABLE I

| | Reaction Components | | | |
|---|---|---|---|---|
| Reaction No. | DCPD[a] (g) | Phenol[b] (g) | Fatty Acid (g) | Fumaric Acid (g) |
| 1 | 1260 | 180 A<br>90 B | 234 E | 36 |
| 2 | 1260 | 234 A<br>36 B | 234 E | 36 |
| 3 | 1233 | 266 A<br>32 B | 252 E | 18 |
| 4 | 1224 | 306 B | 243 F | 36 |
| 5 | 1260 | 270 A | 252 I | 18 |
| 6 | 1260 | 270 A | 126 F<br>126 I | 18 |
| 7 | 1260 | 270 A | 252 G | 18 |
| 8 | 1260 | 270 A | 126 G<br>126 I | 18 |
| 9 | 1260 | 270 A | 126 F<br>126 G | 18 |
| 10 | 1260 | 234 A<br>36 B | 252 G | 18 |
| 11 | 1206 | 288 A<br>18 B | 162 G<br>108 I | 18 |
| 12 | 1233 | 144 C<br>153 D | 252 E | 18 |
| 13 | 900 | 150 A | 450 H | 18 |

[a]Resin grade dicyclopentadiene concentrate (about 80% DCPD)
[b]A = nonylphenol; B = bisphenol A; C = octyl phenol; D = p-tert-butyl phenol
[c]E = distilled tall oil; F = tall oil fatty acid; G = dimer fatty acid; H = tall oil rosin; I = AR grade linseed oil (ARLO)

TABLE II

| | Reaction Conditions | | | |
|---|---|---|---|---|
| Reaction No. | Temp. (°C.) | Time (hours) | Yield (%) | Acid No. |
| 1 | 275 | 5 | 86.9 | 14.0 |
| 2 | 275 | 9 | 88.2 | 13.8 |
| 3 | 275 | 12 | 90.0 | 13.8 |
| 4 | 275 | 9 | 92.5 | 18.0 |
| 5 | 275 | 10 | 88.4 | 6.0 |
| 6 | 275 | 16 | 89.0 | 7.4 |
| 7 | 275 | 13 | 91.8 | 17.2 |
| 8 | 275 | 12 | 90.8 | 10.0 |
| 9 | 275 | 20 | 91.3 | 16.0 |
| 10 | 275 | 9 | 90.9 | 14.0 |
| 11 | 275 | 14 | 90.0 | 9.5 |
| 12 | 275 | 18 | 89.7 | 16.0 |
| 13 | 270 | 4 | 83.8 | 10.6 |

TABLE III

Physical Properties of Reaction Products

| Reaction No. | Soft. point (°C.) | Visc. 50% M47 | MAGIESOL 47 tolerance (cc) | ARLO tolerance (cc) | 50% MAGIESOL 47 color | 33.3% Resin in ARLO visc. |
|---|---|---|---|---|---|---|
| 1 | 159 | Z6.8 | 1.5 | 200+ | 14 | X.5 |
| 2 | 161 | Z4.1 | 6 | 200+ | 14 | X.5 |
| 3 | 160 | Z3.2 | 11 | 200+ | 12 | X.7 |
| 4 | 169 | Insol | Insol | Insol | Insol | Z2.3 |
| 5 | 157 | Z4.3 | 10 | 28 | 14 | Z2.5 |
| 6 | 155 | Z3.2 | 14 | 200+ | 14 | Z.3 |
| 7 | 151 | Z1.1 | 24 | 200+ | 15 | Y.8 |
| 8 | 154 | Z2.9 | 14 | 200+ | 16 | Z.4 |
| 9 | 153 | Z1.7 | 21 | 200+ | 16 | Y.2 |
| 10 | 147 | Z2 | 9 | 200+ | 15 | X.4 |
| 11 | 157 | Z3.4 | 10.5 | 200+ | 14 | X.8 |
| 12 | 161 | Z3.5 | 18 | 200+ | 15 | Y.2 |
| 13 | 136 | O.3 | 200+ | 200+ | 12 | T.2 |

As is shown in Tables II and III, the reaction of resin grade DCPD with one or more phenols, a fatty acid or fatty acid derivative, and fumaric acid generally gave resins with physical characteristics suitable for use with ink vehicles. With the exception of Reaction 4, the resins produced according to the present invention had good MAGIESOL 47 and ARLO tolerance. In addition, the resins had viscosity measurements (at 50% MAGIESOL or 33.3% ARLO) well within the range desired for use in ink vehicle formulations.

The resin produced in Sample 4 was insoluble in MAGIESOL 47 but had excellent compatibility in AR-grade Linseed Oil. This formulation used Bisphenol A as the sole alkyl phenol modifier. The resin produced from this reaction apparently has a very polar, highly branched molecular structure, which renders it insoluble in aliphatic ink oil but compatible in the polar AR-grade Linseed Oil. This resin along with Samples 1–3 and 10–11, illustrates how increasing levels of Bisphenol A can be used to modify aliphatic ink oil solubility while improving Linseed Oil compatibility. Samples 1–3, 10 and 11 show that a minority of bisphenol A can be used to prepare a suitable resin if mixed with a majority of nonylphenol. The other samples show the suitability of nonylphenol, octylphenol and p-tert-butylphenol with DCPD in the preparation of these resins.

Example III

Resins from Example I, Example II (Reaction No. 8), and a commercially available resin prepared by the traditional two-step method (RESINALL 521, manufactured by Resinall Corporation, of Stamford, CT) were all tested for solution properties by preparing test solutions of each resin comprising 50 wt. % of MAGIESOL 47 product and 50 wt. % of the resin. The test solutions were prepared by weighing resin and solvent into an Erlenmeyer flask and heating and stirring on a hot plate equipped with a magnetic stirring device until all resin was dissolved in the solvent. In solution 1, the resin used was the commercially available Resinall 521. In solution 2, the resin used was the resin prepared in Example I. In solution 3, the resin used was the resin of Reaction 8 from Example II. The physical properties of the resin, softening point and acid number, and the properties of the above described resin solutions are given in Table IV.

TABLE IV

| Resin | Solution 1 RESINALL 521 | Solution 2 Example I | Solution 3 Example II Reaction No. 8 |
|---|---|---|---|
| Resin Properties | | | |
| Softening Point (°C.) (ASTM E28-67) | 164 | 161 | 154 |
| 50% MAGIESOL 47 Viscosity | Z4 | Z3.2 | Z3 |
| MAGIESOL 47 Tolerance (cc) | 5 | 22 | 14 |
| Linseed Oil (AR) Tolerance (cc) | 200+ | 200+ | 200+ |
| Acid Number (ASTM D465-59) | 21.0 | 16.2 | 10.0 |

One skilled in the art will recognize that the data in Table IV demonstrate that the three resins have similar physical properties prior to being formulated into an ink vehicle for comparison. It is noteworthy that even though the solution viscosities of the two resins of the invention are slightly less than that of the competitive product, both of these resins ultimately imparted a greater viscosity and higher yield value to a gelled ink vehicle.

Resins from Examples I and II (Reaction No. 8) were used to prepare lithographic ink vehicles. In addition, RESINALL 521 was used to prepare a control ink vehicle according to prior art. The three ink vehicles were prepared by the following formulations and procedure:

| Item No. | Ingredients | Vehicle No. 1 | Vehicle No. 2 | Vehicle No. 3 |
|---|---|---|---|---|
| 1 | RESINALL 521 | 58.68 gm | — | — |
|   | Example I | — | 58.68 gm | — |
|   | Example II (Sample 8) | — | — | 58.68 gm |
| 2 | BECKACITE ™ 112[a] | 13.77 | 13.77 | 13.77 |
| 3 | No. 7 Alkyd[b] | 7.65 | 7.65 | 7.65 |
| 4 | ARLO[c] | 7.65 | 7.65 | 7.65 |
| 5 | 50% AIE-M Gellant Solution[d] | 1.53 | 1.53 | 1.53 |
| 6 | 50% OAO Gellant Solution[e] | 4.59 | 4.59 | 4.59 |
| 7 | MAGIESOL ™ 47[f] | 56.13 | 56.13 | 56.13 |
|   |   | 150 gm | 150 gm | 150 gm |

[a]Phenol-modified rosin ester - Arizona Chemical.
[b]Alkyd 6V12 product supplied by Sun Chemical.
[c]Alkali Refined Linseed Oil.
[d]Gelling agent, aluminum diisopropoxide acetoacetic ester chelate, 50 wt. % in MAGIESOL 47.
[e]Gelling agent, oxyaluminum octoate, 50 wt. % in MAGIESOL 47.
[f]MAGIESOL 47 is a hydrotreated aliphatic ink oil produced by Magie Brothers Oil Co., Div. of Pennzoil Corp.

All ingredients except the gelling agent solutions, items No. 5 and 6, were weighed into a 500 ml three-necked flask fitted with a stirrer and temperature measuring device. The flask was heated with a heating mantle to 170° C. with stirring until all resin was dissolved in the alkyd, ARLO, and solvent. The AIE-M gellant solution, item No. 5 was added slowly. The reaction was allowed to continue at 170° C. for thirty minutes. The vapors given off by this reaction were handled with care according to standard known techniques. The OAO gellant solution was then added (item No. 6) and the reaction was continued for one hour at 170° C. The gelled ink vehicle was then removed from the flask. Physical characteristics of the ink vehicles are listed in Table V.

TABLE V

|   | Vehicle No. 1 | Vehicle No. 2 | Vehicle No. 3 |
|---|---|---|---|
| Laray Viscosity (Poise) | 254 | 332 | 364 |
| Yield Value (Dynes/cm$^2$) | 3,657 | 4,929 | 10,106 |
| Shortness Ratio (Yield/Visc.) | 14.4 | 14.8 | 27.8 |
| MAGIESOL 47 Tolerance[1] | 9 | 21 | 15 |

[1]Vehicle is titrated to cloud point with MAGIESOL 47. (milliliters/10 grams)

The properties of the ink vehicles made from resins prepared by the method of the present invention were substantially better than those of the vehicle prepared from the commercially available resin which was prepared by the traditional two-step process. The solubility of the gels (the tolerance of the gel as measured by the number of milliliters of MAGIESOL 47 that can be added to 10 grams of vehicle before clouding) prepared from the resins of the present invention was far superior to the gel prepared with commercially available resin. This is contrary to the traditional knowledge of the art where it is assumed that the reactivity decreases as the solubility increases. The resins of the present invention had an increased solubility with much better gel vehicle characteristics.

Having thus described various preferred embodiments of the invention, and several of its benefits and advantages, it will be understood by those of ordinary skill that the foregoing description is merely for the purpose of illustration and that numerous substitutions, rearrangements, and modifications may be made in the invention without departing from the scope and spirit of the appended claims.

What is claimed is:

1. A method for preparing a modified dicyclopentadiene resin consisting essentially of
reacting (a) dicyclopentadiene, (b) a phenol selected from the group consisting of an alkyl phenol having the formula $CH_3C_nCH_{2n}C_6H_4OH$, where n is from 1 to 9, and a bisphenol having the formula $HOC_6H_4(CR_2)_xC_6H_4OH$, where R is independently hydrogen or a $C_1$–$C_6$ alkyl group and x is from 1 to 4, or mixtures thereof; (c) a fatty acid or a derivative thereof selected from the group consisting of tall oil, a tall oil derivative, dimer fatty acid, linseed oil and mixtures thereof; and (d) an unsaturated organic diacid or an anhydride thereof, at a temperature and pressure sufficient to produce a phenol-modified cyclopentadiene resin.

2. A method according to claim 1 wherein the reaction mixture comprises (a) about 45 wt. % to about 80 wt. % of the dicyclopentadiene, about 10 wt. % to about 20 wt. % of the phenol, about 10 wt. % to about 20 wt. % of the fatty acid or derivative thereof, and 0.5 wt. % to about 1.5 wt. % unsaturated organic diacid or an anhydride thereof.

3. A method according to claim 1 wherein the phenol or mixture thereof is $CH_3(CH_2)_8C_6H_4OH$, $CH_3(CH_2)_7C_6H_4OH$, t-$C_4H_9C_6H_4OH$, bisphenol A, the fatty acid or derivative thereof is distilled tall oil, tall oil fatty acid, tall oil rosin, dimer fatty acid, ARLO or mixtures thereof, and the unsaturated organic diacid or an anhydride thereof is selected from the group consisting of fumaric acid, maleic acid and maleic anhydride.

4. A method according to claim 1 wherein the reaction mixture is maintained at a temperature in the range of from about 260° C. to about 290° C. for a period of time in the range of from about 6 hours to about 24 hours.

5. A method according to claim 1, further comprising the step of sparging the reaction product to purify the phenol-modified dicylopentadiene resin.

6. A phenol-modified dicyclopentadiene resin prepared according to the method of claim 1.

7. An ink vehicle comprising a phenol-modified dicyclopentadiene resin prepared according to claim 1 and a gelling agent.

8. A method for preparing a modified dicyclopentadiene resin comprising the steps of:
charging a reaction vessel with a reaction mixture comprising: (a) dicyclopentadiene, (b) a phenol selected from the group consisting of an alkyl phenol having the formula $CH_3C_nH_{2n}C_6H_4OH$, wherein n is from 1 to 9, and a bisphenol having the formula $HOC_6H_4(CR_2)_xC_6H_4OH$, wherein R is independently hydrogen or a $C_1$–$C_6$ alkyl group and x is from 1 to 4, or mixtures thereof; (c) a fatty acid or a derivative thereof selected from the group consisting of tall oil, a tall oil derivative, dimer fatty acid, linseed oil and mixtures thereof; and (d) an unsaturated organic diacid or an anhydride thereof;
sealing the reaction vessel;
heating the reaction mixture to a reaction temperature; and
maintaining the reaction mixture at the reaction temperature under autogenous pressure for a period of time sufficient to produce a reaction product including a phenol-modified dicyclopentadiene resin.

9. A method according to claim 8 wherein the reaction mixture comprises (a) about 45 wt. % to about 80 wt. % of the dicyclopentadiene, about 10 wt. % to about 20 wt. % of the phenol, about 10 wt. % to about 20 wt. % of the fatty acid or derivative thereof, and 0.5 wt. % to about 1.5 wt. % of the unsaturated organic diacid or an anhydride thereof.

10. A method according to claim 8 wherein the phenol or mixture thereof is $CH_3(CH_2)_8C_6H_4OH$, $CH_3(CH_2)_7C_6H_4OH$, $t-C_4H_9C_6H_4OH$, bisphenol A, the fatty acid or derivative thereof is distilled tall oil, tall oil fatty acid, tall oil rosin, dimer fatty acid, ARLO or mixtures thereof, and the unsaturated organic diacid or an anhydride thereof is selected from the group consisting of fumaric acid, maleic acid and maleic anhydride.

11. A method according to claim 8 wherein the reaction mixture is maintained at a temperature in the range of from about 260° C. to about 290° C. for a period of time in the range of from about 6 hours to about 24 hours.

12. A method according to claim 8, further comprising the step of sparging the reaction product to recover the phenol-modified dicyclopentadiene resin.

13. A phenol-modified dicyclopentadiene resin prepared according to the method of claim 8.

14. An ink vehicle comprising a phenol-modified dicyclopentadiene resin prepared according to claim 8 and a gelling agent.

15. A method for preparing a modified dicyclopentadiene resin, comprising the steps of:

charging a pressurizable reactor vessel with a reaction mixture comprising (a) 45 wt. % to about 80 wt. % of dicyclopentadiene, (b) about 10 wt. % to about 20 wt. % of a phenol selected from the group consisting of an alkyl phenol having the formula $CH_3C_nH_{2n}C_6H_4OH$, wherein n is from 1 to 9, and a bisphenol having the formula $HOC_6H_4(CR_2)_xC_6H_4OH$, wherein R is independently hydrogen or a $C_1$–$C_6$ alkyl group and x is from 1 to 4, or mixtures thereof; (c) about 10 wt. % to about 20 wt. % of a fatty acid or a derivative thereof selected from the group consisting of tall oil, a tall oil derivative, dimer fatty acid, linseed oil and mixtures thereof; and (d) about 0.5 wt. % to about 1.5 wt. % of an unsaturated organic diacid or an anhydride thereof;

sealing the reaction vessel;

heating the reaction mixture to a reaction temperature from about 260° C. to about 290° C. over a period of time from about 45 minutes to about 75 minutes;

maintaining the reaction mixture at the reaction temperature from about 260° C. to about 290° C. for a period of time from about 6 hours to about 24 hours to provide a reaction product; and sparging the reaction product to recover the phenol-modified dicyclopentadiene resin.

16. A method according to claim 15 wherein the phenol is $CH_3(CH_2)_8C_6H_4OH$, $CH_3(CH_2)_7C_6H_4OH$, $t-C_4H_9C_6H_4OH$, bis-phenol A or mixtures thereof, the fatty acid or derivative thereof is distilled tall oil, tall oil fatty acid, tall oil rosin, dimer fatty acid, ARLO or mixtures thereof, the unsaturated organic diacid or anhydride thereof is selected from the group consisting of fumaric acid, maleic acid and maleic anhydride; and the sparging step is accomplished by use of steam, carbon dioxide, or nitrogen.

17. A phenol-modified dicyclopentadiene resin prepared according to the method of claim 15.

18. A phenol-modified dicyclopentadiene resin prepared according to claim 1 having a softening point in the range of from about 135° C. to about 175° C., a color in the range of from about Gardner 11 to about Gardner 18 and an acid number in the range of from about 5.5 to about 18.

19. A method for preparing a modified dicyclopentadiene resin, consisting essentially of:

reacting a mixture comprising (a) at least about 45 wt. % dicyclopentadiene based on the total weight of reactants in the mixture, (b) a phenol selected from the group consisting of an alkyl phenol having the formula $CH_3C_nCH_{2n}C_6H_4OH$, where n is from 1 to 9, and a bisphenol having the formula $HOC_6H_4(CR_2)_xC_6H_4OH$, where R is independently hydrogen or a $C_1$–$C_6$ alkyl group and x is from 1 to 4, or mixtures thereof; (c) a fatty acid or a derivative thereof selected from the group consisting of tall oil, a tall oil derivative, dimer fatty acid, linseed oil and mixtures thereof; and (d) an unsaturated organic diacid or an anhydride thereof, at a temperature and pressure sufficient to produce a phenol-modified cyclopentadiene resin.

20. A method according to claim 19 wherein the mixture comprises (a) about 45 wt. % to about 80 wt. % of the dicyclopentadiene, about 10 wt. % to about 20 wt. % of the phenol, about 10 wt. % to about 20 wt. % of the fatty acid or derivative thereof, and 0.5 wt. % to about 1.5 wt. % unsaturated organic diacid or an anhydride thereof.

21. A method according to claim 19 wherein the phenol or mixture thereof is $CH_3(CH_2)_8C_6H_4OH$, $CH_3(CH_2)_7C_6H_4OH$, $t-C_4H_9C_6H_4OH$, bisphenol A, the fatty acid or derivative thereof is distilled tall oil, tall oil fatty acid, tall oil rosin, dimer fatty acid, ARLO or mixtures thereof, and the unsaturated organic diacid or an anhydride thereof is selected from the group consisting of fumaric acid, maleic acid and maleic anhydride.

22. A method according to claim 19 wherein the mixture is maintained at a temperature in the range of from about 260° C. to about 290° C. for a period of time in the range of from 6 hours to about 24 hours.

23. A method according to claim 19, further comprising the step of sparging the reaction product to purify the phenol-modified dicyclopentadiene resin.

24. A phenol-modified dicyclopentadiene resin prepared according to the method of claim 19.

25. An ink vehicle comprising a phenol-modified dicyclopentadiene resin prepared according to claim 19 and a gelling agent.

* * * * *